May 17, 1960  H. K. GLEASMAN ET AL  2,936,650
MANUAL SHIFTING DEVICE FOR BICYCLE GEARING
Filed Dec. 22, 1958  2 Sheets-Sheet 1
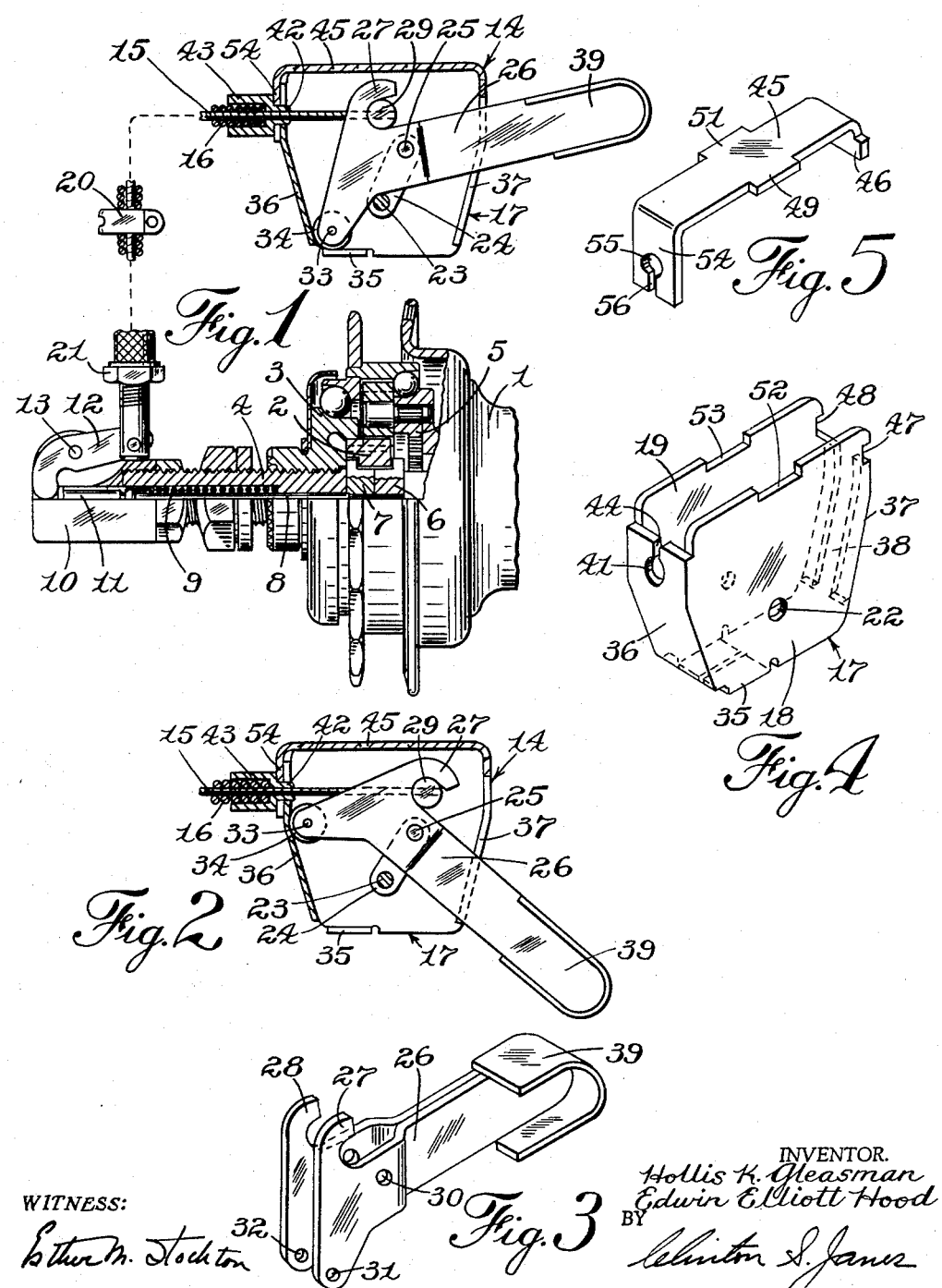
WITNESS:
Esther M. Stockton
INVENTOR.
Hollis K. Gleasman
Edwin Elliott Hood
BY
Clinton S. Janes
ATTORNEY May 17, 1960 H. K. GLEASMAN ET AL 2,936,650
MANUAL SHIFTING DEVICE FOR BICYCLE GEARING
Filed Dec. 22, 1958 2 Sheets-Sheet 2
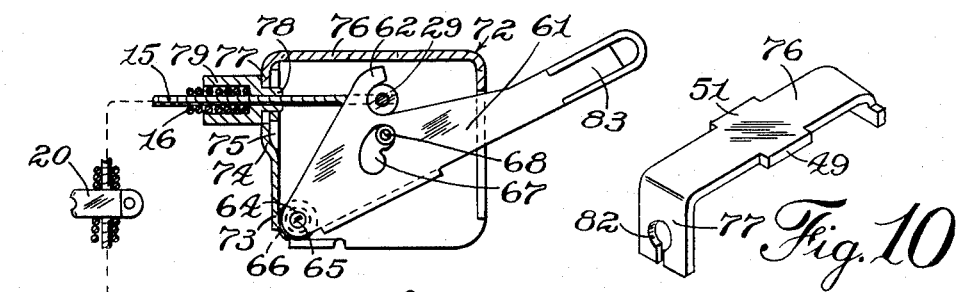
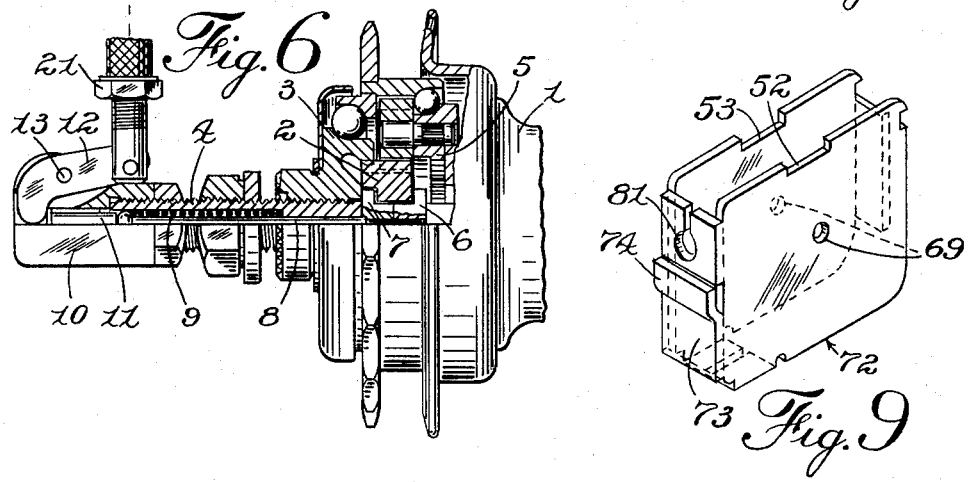
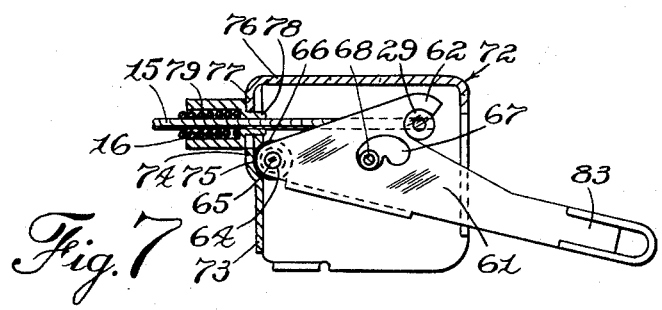
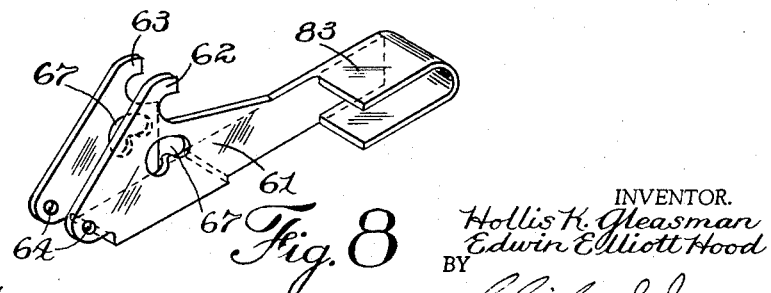
WITNESS:
Esther M. Stockton
INVENTOR.
Hollis K. Gleasman
Edwin Elliott Hood
BY
Clinton S. Janes
ATTORNEY

United States Patent Office 2,936,650
Patented May 17, 1960

2,936,650

MANUAL SHIFTING DEVICE FOR BICYCLE GEARING

Hollis K. Gleasman and Edwin Elliott Hood, Elmira, N.Y., assignors to Bendix Aviation Corporation, Elmira Heights, N.Y., a corporation of Delaware Application December 22, 1958, Serial No. 782,120

7 Claims. (Cl. 74—489)

The present invention relates to a manual shifting device for bicycle gearing and more particularly a remote control for a two-speed bicycle hub brake.

In devices of this type such as shown, for instance, in the patent to Hood 2,609,712, issued September 9, 1952, it is customary to operate the change speed mechanism in the hub by means of a flexible cable leading to an actuating device located within convenient reach of the operator. The change in gear ratio is accomplished by shifting a sun gear from a low gear position where it is clutched to the stationary axle, to a high gear position in which it is clutched to a planet carrier.

It is important that such shifting of the sun gear be accomplished completely and reliably since a failure to complete proper travel of the sun gear may cause milling of the teeth or even a failure to engage. This could render the device inoperative for either driving or braking, and thereby cause the operator to lose control of the vehicle.

It is an object of the present invention to provide a novel shifting device for two-speed bicycle gearing which is efficient and reliable in operation while being simple and economical in construction.

It is another object to provide such a device incorporating a flexible cable and means for applying tension to the cable having a substantially straight line motion to avoid flexing the cable.

It is another object to provide such a device having a comparatively wide latitude of travel in relation to its overall dimensions, whereby adjustment of the device is not critical.

It is another object to provide such a device including a casing which is so formed as to provide a detent action conducive to full stroke operation of the device, with resistive retention of the control lever in either of its operative positions.

It is another object to provide such a device which is readily assembled and disassembled without requiring tools or extraneous fastening means.

Further objects and advantages will be apparent from the following description taken in connection with the accompanying drawing in which:

Fig. 1 shows a preferred embodiment of the shifting means with the cooperating portions of the two-speed hub, partly broken away and in section, the parts being in the low-speed position;

Fig. 2 is a side elevation of the shifting means, with the casing broken away and in section, showing the parts in the high gear position;

Fig. 3 is a detail in perspective of the shifting lever illustrated in Figs. 1 and 2;

Fig. 4 is a detail in perspective of the casing with its cover removed;

Fig. 5 is a similar detail of the cover;

Fig. 6 is a view similar to Fig. 1 showing a second embodiment of the invention;

Fig. 7 is a side elevation of the shifting device shown in Fig. 6 with the casing cut away, the parts being shown in the high gear position;

Fig. 8 is a detail in perspective of the shifting lever shown in Figs. 6 and 7;

Fig. 9 is a detail in perspective of the casing illustrated in Figs. 6 and 7 with the cover removed; and Fig. 10 is a similar view of the cover.

In Fig. 1 of the drawing there is illustrated a portion of a two-speed hub 1 of the kind illustrated in the patent to Hood above cited, showing a sun-gear 2 in clutching engagement with a member 3 fixed to the stationary axle 4. Means for shifting the sun-gear into clutching engagement with a planet carrier 5 is provided comprising yoke members 6, 7 fixed on the end of a shift rod 8 slidably mounted in the axle 4 and yieldably urged to the left in Fig. 1 by means of a compression spring 9.

The rod 8 is shifted axially to the right against the spring 9 by a thrust member 11 which is actuated by a bell crank lever 12 pivoted at 13 in a cap member 10 threaded on the end of the axle.

In order to actuate the lever 12 manually, a shifting device indicated generally by the numeral 14 is mounted in any suitable manner in a position convenient to the operator such as the handle bar of the bicycle. Said shifting device is connected to the lever by means of a flexible cable 15 having a sheath 16 which is clamped to the frame of the bicycle in the usual manner as indicated at 20, so as to maintain the end of the sheath pressed against said shifting device. The lower end of the cable is adjustably attached to the lever 12 as indicated at 21. The structure so far described is substantially similar to the disclosure in the patent to Hood above cited, the present invention being concerned with the means for actuating the cable 15.

The shifting device 14 comprises a casing 17 having substantially flat sides 18, 19 with registering openings 22 for receiving a pivot pin 23 fixedly mounted therein. A link 24 is pivoted on said pin and carries at its upper end a second pin 25 which is fixedly mounted in any suitable manner in alined openings 30 in a shifting lever 26 best shown in Fig. 3, thereby forming a floating or swinging fulcrum for said lever.

Lever 26 is bifurcated for a portion of its length and formed with hooks 27, 28 forming a seat for a cylindrical terminal block 29 fixed in any suitable manner on the upper end of the cable 15, the cable being arranged to extend between said hooks. The lower end of lever 26 has registering openings 31, 32 in which a pin 33 is fixedly mounted forming a bearing for a roller 34 which bears on the bottom 35 and the front end wall 36 of the casing 17.

The opposite end wall 37 of the casing is slotted as indicated at 38 (Fig. 4) to permit passage of the actuating arm 39 of the lever 26.

The front end wall 36 of the casing has an opening 41 for receiving the reduced extension 42 of a nipple 43 fixedly mounted on the upper end of the sheath 16 of cable 15. A slot 44 is also formed in said end wall of the casing to permit entry of the cable 15 laterally into the opening 41.

The casing 17 is provided with a cover 45 extending over the top of the casing, which is bent down and formed with lugs as indicated at 46 for reception in notches 47, 48 in an edge portion of side walls 18 and 19, respectively of the casing 17, and also with lateral extensions 49, 51 seating in depressions 52, 53 formed in the top edges of the sides 18, 19 of the casing. The forward end of the cover 45 is also bent down as shown at 54 and formed with an opening 55 which is also arranged to receive the extension 42 of the bushing 43, and is slotted as shown at 56 to permit lateral passage of the cable 15.

In assembling the shifting device the cable 15 is first passed through the slot 44 in the front end wall of the casing and the anchor block 29 seated in the hooks 27, 28 of lever 26. The cover 45 is then hooked over the rear end of the casing and, while the bushing 43 is withdrawn against the expansive force of the sheath 16, the cover is swung down until opening 55 of the cover registers with the opening 41 of the casing, after which the extension 42 of bushing 43 is permitted to project into said registering openings, where it is maintained by the expansive force of the sheath 16 and thus locks the casing and cover in assembled relation.

In operation, starting with the parts in the low gear position as illustrated in Fig. 1 downward pressure by the operator on the projecting arm 39 of the lever causes the lever to swing on the link 24 while the roller 34 moves up on the front end wall 36 of the casing to the position shown in Fig. 2. It will be noted that this manipulation of the lever causes the hooks 27, 28, and consequently the anchored end of the cable 15, to move in the substantially horizontal path in alignment with the bushing 43 of the cable sheath 16, thus shifting the sun gear 2 against the force of the spring 9 from its low gear to its high gear position. Since the end wall 36 of casing 17 is inclined to the vertical as illustrated, when the lever has reached the high gear position as shown in Fig. 2, the tension of the cable on the lever, in conjunction with the supporting force of the link 24, produces a resolution of forces resisting return movement of the lever to low gear position. The tension of the cable, as maintained by the spring 9, thus tends to maintain the lever in either of its two operative positions.

The shifting down to low gear is of course effected by raising the handle 39 of lever 26 whereby the parts of the shifting device are returned to their low gear positions and retained therein by the tension of the cable 15.

In Figs. 6 to 10 inclusive of the drawing, a second embodiment of the invention is illustrated which differs from the first embodiment only in the form and method of mounting the shifting lever, and in the conformation of the casing. The remaining parts, being similar to those of the first embodiment, are similarly numbered.

In Fig. 8, the shifting lever 61 is shown to be formed with a bifurcated portion having hooks 62, 63 for receiving the anchor block 29 of cable 15, and with registering openings 64, for receiving the pivot pin 65 of the roller 66. In this case, however, instead of the link supporting means shown in the previous embodiment, the lever 61 has registering curved openings 67 slidably receiving a pin 68 fixedly mounted in registering openings 69, in the casing 72 (Fig. 9), to thereby form the floating fulcrum for the lever.

The front end wall 73 of casing 72 is substantially vertical, but has a partially sheared or struck out portion 74 forming an internal recess 75 for receiving the roller 66 in the high gear position of the lever 61. The cover 76 is constructed similarly to that of the first embodiment and when assembled, its front end 77 rests on the projecting portion 74 of the end wall 73 of the casing, where it is retained by the reduced portion 78 of nipple 79 projecting through the registering openings 81 and 82 of the case and cover.

With this embodiment of the invention, downward pressure on the projecting arm 83 of lever 61 causes the roller 66 to move up the end wall 73 of casing 72 until it rests in the seat formed by the depression 75 in said end wall. During this movement the lever 61 is guided by the engagement of the fixed pin 68 in the curved openings 67 of the lever whereby the hooks 62, 63, and consequently the anchored end of the cable 15, describe a substantially horizontal path away from the nipple 79. At the end of this movement, as illustrated in Fig. 7, the gearing has been shifted into its high gear position, where it is yieldably maintained by the tension of the cable 15 resisting displacement of the roller 66 from the seat 75.

Although but two embodiments of the invention have been shown and described in detail, it will be understood that changes may be made in the form and arrangement of the parts without departing from the spirit of the invention.

We claim:
1. A remote controlling device for two-speed bicycle gearing comprising a flexible cable and means for reciprocating the cable including a fixed casing having front and rear walls, guide means conducting one end of the cable through the front wall into the casing, a terminal block fixed on said end of the cable, a lever mounted in the casing having a seat for receiving said block arranged on rotation and translation of the lever to apply tension to the cable through the block, and an operating arm extending from the casing through the rear wall thereof, the inner end of said lever having a thrust bearing on the front wall of the casing; and a floating fulcrum for the lever in the casing so arranged in relation to said front wall of the casing that rotation of the lever causes its inner end to traverse the front wall of the casing and thereby move the lever bodily away from said guide means to cause said seat to describe a path between the high and low gear positions of the seat substantially in alinement with said guide.

2. A device as set forth in claim 1 in which the wall of the casing forming the bearing for the inner end of the lever is so inclined in relation to the fulcrum of the lever that the tension of the cable resists movement of the lever away from either of its operative positions.

3. A device as set forth in claim 1 in which the floating fulcrum for the lever in the casing is so arranged in conjunction with the thrust bearing on the front wall of the casing that pivotal movement of the lever around its fulcrum to draw the cable into the casing is also operative to translate the lever bodily in the direction to increase the travel of the cable.

4. A device as set forth in claim 1 in which the floating fulcrum for the lever is in the form of a link member pivoted at one end on the casing, and at the other end to an intermediate point of the lever.

5. A device as set forth in claim 4 in which the front wall of the casing which forms the bearing for the inner end of the lever is so inclined with respect to the direction of travel of the cable in the casing that the tension of the cable resists rotation of the lever away from either of its operative positions.

6. A device as set forth in claim 1 in which the casing is formed of a body portion comprising a bottom, two parallel side walls spaced to permit free passage of the cable terminal block therebetween, and front and back end walls, the guide means for the cable being mounted in said front end wall, said guide and front end wall of the casing being slotted to admit the cable; and a detachable cover for the casing, the rear of the cover being attached to the back end wall of the casing, and the front of the cover being slotted to admit the cable, said front end wall of the casing and the front of the cover having registering openings for admitting the guiding means for the cable.

7. A device as set forth in claim 6 in which the cable is provided with a flexible sheath, and the guiding means for the cable is in the form of a nipple mounted on the end of the sheath and formed with a reduced extension entering said registering openings in the casing and cover and thereby anchoring the cover to the casing.

References Cited in the file of this patent

UNITED STATES PATENTS

| 2,770,980 | Millward | Nov. 20, 1956 |
| 2,854,857 | Gleasman et al. | Oct. 7, 1958 |

FOREIGN PATENTS

| 54,848 | France | Jan. 18, 1950 |
| | (Addition to No. 935,878) | |
| 345,449 | France | Nov. 30, 1904 |
| 744,320 | Great Britain | Feb. 1, 1956 |
| 792,769 | Great Britain | Apr. 2, 1958 |
| 807,064 | Germany | June 25, 1951 |